United States Patent
Young et al.

[11] Patent Number: 6,144,365
[45] Date of Patent: Nov. 7, 2000

[54] SYSTEM AND METHOD FOR PERFORMING BLENDING USING AN OVER SAMPLING BUFFER

[75] Inventors: Eric S. Young, San Jose; Randy X. Zhao; Anoop Khurana, both of Fremont; Roger Niu, San Jose; Dong-Ying Kuo, Pleasanton; Sreenivas R. Kottapalli, Milpitas, all of Calif.

[73] Assignee: S3 Incorporated, Santa Clara, Calif.

[21] Appl. No.: 09/060,923

[22] Filed: Apr. 15, 1998

[51] Int. Cl.[7] .............................. G09G 5/10; G09G 5/04
[52] U.S. Cl. .......................... 345/153; 345/147; 345/150
[58] Field of Search ............................. 345/22, 88, 147, 345/150, 153, 431; 382/162, 164, 166, 167

[56] References Cited

U.S. PATENT DOCUMENTS

| | | | |
|---|---|---|---|
| 5,652,601 | 7/1997 | Coelho et al. | 345/153 |
| 5,774,577 | 6/1998 | Veda et al. | 382/162 |
| 5,828,781 | 10/1998 | Nakano | 382/167 |
| 5,835,242 | 11/1998 | Itoh | 382/167 |
| 5,896,136 | 4/1999 | Augustine et al. | 345/431 |

*Primary Examiner*—Vijay Shankar
*Attorney, Agent, or Firm*—Fenwick & West LLP

[57] ABSTRACT

The present invention provides an alpha blending unit that is able to perform alpha blending on sub-samples of a pixel in an efficient manner. The alpha blending unit preferably comprises a plurality of registers for storing a source color, a blending value, and a plurality of destination sub-sample values, multipliers, adders, an accumulator and a divider. The alpha blending unit advantageously sums the destination sub-sample values and then divides them by the number of sub-samples to generate a combined destination color value. This combined destination color value along with the source color and a blending value are then provided to the multipliers, and adders to generate a new destination color value for the pixel.

21 Claims, 6 Drawing Sheets

SYSTEM AND METHOD FOR PERFORMING BLENDING USING AN OVER SAMPLING BUFFER

BACKGROUND OF THE INVENTION

1. Field of the Invention

The present invention relates generally to systems and methods for rendering graphic images on a display device. In particular, the present invention relates to systems and method for performing blending operations. Still more particularly, the present invention relates to a system and a method for performing alpha blending using an over-sampling buffer.

2. Description of the Background Art

In computer graphics and image processing, an image is composed of an array of values. Each value in the array or multiple values in the array correspond to a respective picture element or pixel. Each pixel is preferably represented by a plurality of quantities that specify color, shading or other pixel characteristics.

One important graphics operation is blending. In particular, alpha blending is conventional 3D process that gives a computer-generated image the effect of transparency. Blending occurs when two images must be combined on a pixel-by-pixel basis to produce a composite image. In combining the images, one image is defined as the foreground or source image and the other image is defined as the background or destination image. The combination of the foreground and background images is accomplished through a weighted ratio between corresponding pixels in each image, where each pixel's characteristics are based on a blending value. The blending value indicates a fractional constant, C, by which the foreground and background pixels are weighted. The foreground pixels are weighted by C, and the background pixels are weighted by 1−C. The weighted foreground and background pixels are then summed and averaged on a pixel-by-pixel basis to create a new composite image.

One such prior art method for performing alpha blending in the context of a graphic engine or accelerator is shown in FIG. 1. As shown the process for performing blending begins by retrieving a source color for a pixel in step 100, retrieving a destination color for a pixel in step 102, and retrieving a blend value C in step 104. Then in step 106, the new value for the destination color is generated by computing the value, $x = A \cdot C + B \cdot (1-C)$. Finally, in step 108, the generated blend value is stored back in a frame buffer. Thus, each blending operation requires a memory read of the destination color, a blending of the source color with the destination color, and a memory write operation.

In certain image processing applications, the amount of time available for performing the required calculations for realistically displaying an image transformation is severely limited. Current technology has made image sizes of 1024× 768, or 800×600 pixels commonplace. Blending the pixels of two images to form a composite image must be done on a pixel-by-pixel basis, and therefore, requires millions of computational operations. The computational time constraints are particularly severe in interactive computer graphics situations, in which a computer user influences or directs entire sequences of displayed images. Alpha blending is frequently required in such situations and must be performed as quickly as possible.

When alpha blending is performed, this operation is performed for each pixel, as has been noted above. Eight times over sampling requires eight times more computation and bandwidth per pixel. Further, when eight times over sampling and alpha blending are performed, the computational requirements for alpha blending increase by eight. This results in significant degradation in performance because it requires eight read/modify/write operations to perform one a blend operation per pixel. Thus, when used with an over sampling buffer, the process for alpha blending requires more operations, making it prohibitively expensive.

Therefore, there is a need for an efficient system and method for performing alpha blending when used with an over sampling buffer.

SUMMARY OF THE INVENTION

The present invention overcomes the deficiencies and limitations of the prior art with a system and methods for performing alpha blending using an over-sampling buffer. The system of the present invention includes a graphics engine including, among other components, an over sampling buffer and an alpha blending unit. The present invention is particularly advantageous because it provides an alpha blending unit that is able to perform alpha blending on sub-samples of a pixel in an efficient manner. The alpha blending unit preferably comprises a plurality of registers for storing a source color, a blending value, a plurality of destination sub-sample values, and multipliers, adders, an accumulator and a divider. The alpha blending unit advantageously sums the destination sub-sample values and then divides them by the number of sub-samples to generate a combined destination color value. This combined destination color value along with the source color and a blending value are then provided to the multipliers, and adders to generate a new destination color value for the pixel.

The present invention further comprises a method for performing alpha blending including the steps of determining the sub-samples to be blended, determining the number of sub-samples to be blended, retrieving the destination color for each sub-sample to be blended, adding the retrieved sub-samples together to produce an accumulated value, dividing the accumulated value by the number of sub-samples effectively taking an average, retrieving a source color and a blend value, generating a blend result using the retrieved source color, retrieving a blend value and the divided accumulated value, and storing the blend result in the frame buffer.

DETAILED DESCRIPTION OF THE PREFERRED EMBODIMENTS

Figure 1:
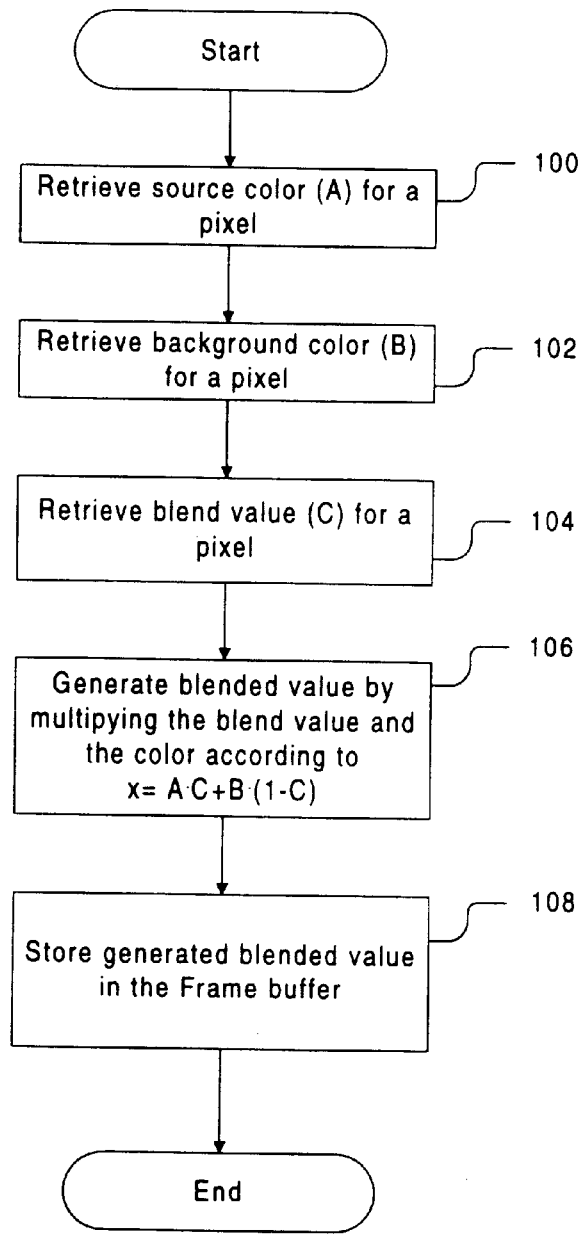
FIG. 1 is a flow chart of a conventional prior art process for performing blending.
Figure 2:
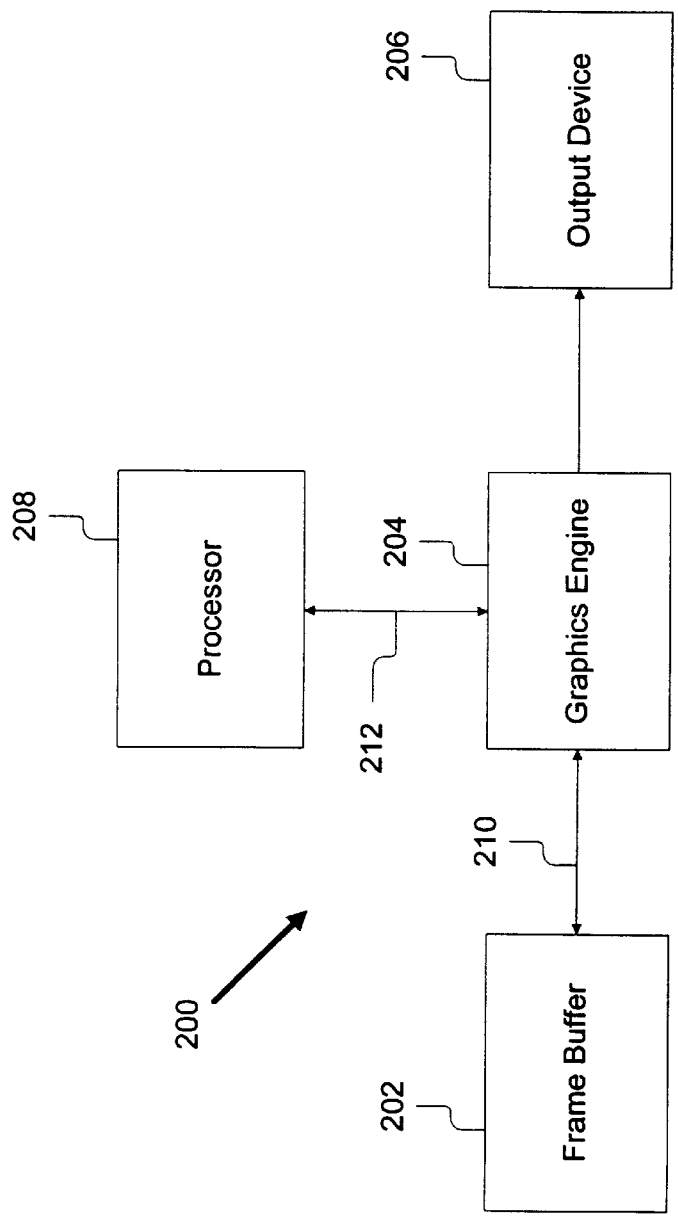
FIG. 2 is a block diagram of a system including a preferred embodiment of the present invention.

Referring now to FIG. 2, a block diagram of a system 200 including a preferred embodiment of the present invention is shown. The system 200 preferably comprises a frame buffer 202, a graphics engine 204, an output device 206, and a processor 208. The system 200 may also include main memory, an input device, a data storage device and a network interface, although not shown. The processor 208 is coupled to the frame buffer 202, the graphics engine 204, and output device 206 in a Von Neuman architecture such as in personal or mini computer. The processor 208 is preferably a microprocessor such as an Intel Pentium; the output device 206 is preferably a video monitor; and the frame buffer 202 is preferably random access memory (RAM). The graphics engine or accelerator 204 includes conventional functionality including 2D graphics processing, 3D graphics processing, and video image processing, such as the ViRGE integrated 3D accelerator manufactured and sold by S3 Incorporated of Santa Clara, Calif. The graphics engine 204 preferably includes additional functionality as will be detailed below for performing blending according to the present invention. As shown, the graphics engine 204 is coupled via line 210 to the frame buffer 202 for sending and receiving data to be rendered on the output device 206. The graphics engine 204 is also coupled by line 212 to the processor 208 to receive data and commands for rendering images on the output device 206.

Figure 3:
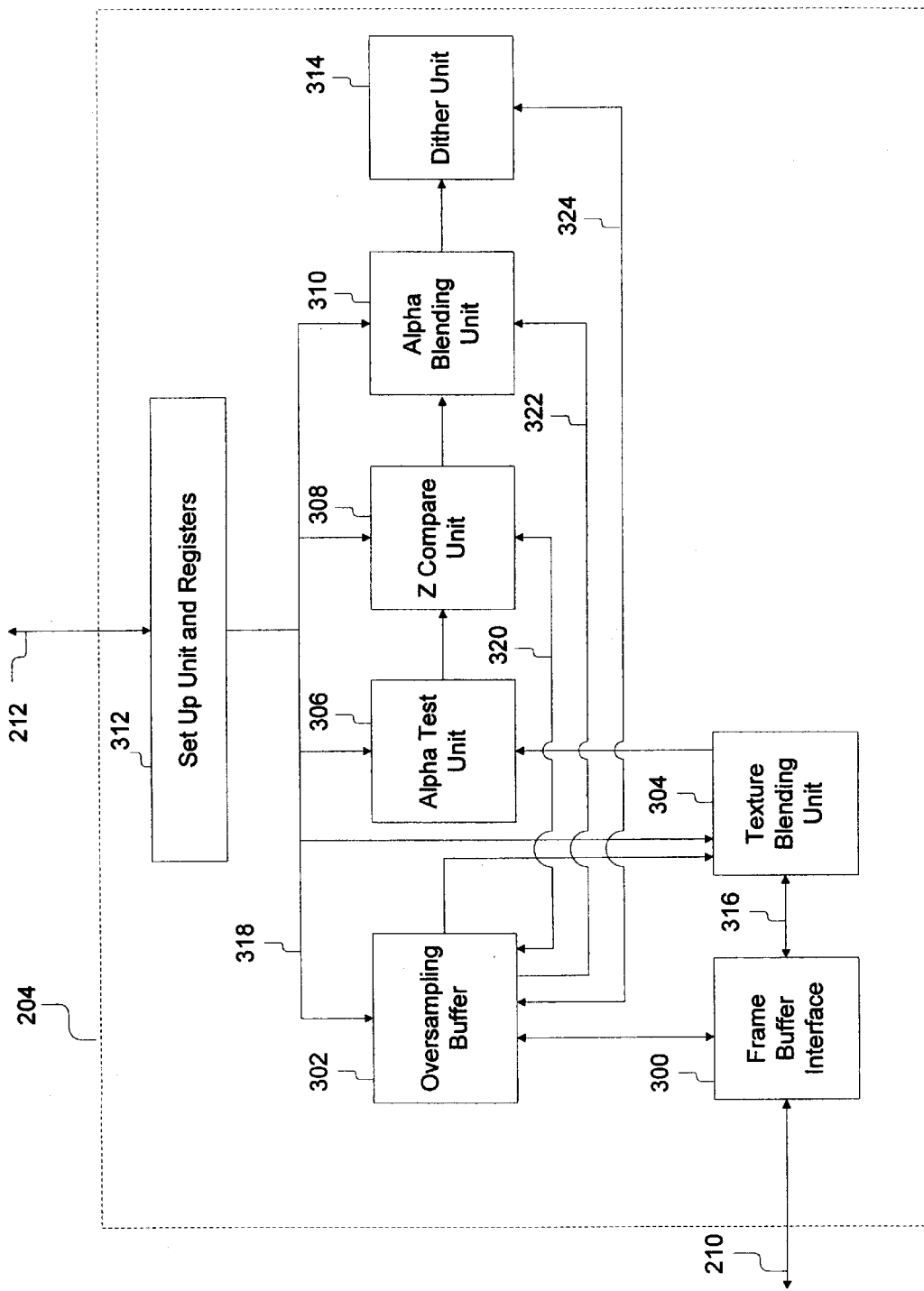
FIG. 3 is block diagram of a graphics engine constructed according to a preferred embodiment of the present invention.

Referring now to FIG. 3, portions of the graphics engine 204 relating to the present invention are shown in more detail. The graphics engine 204 preferably comprises a frame buffer interface 300, an over sampling buffer 302, a texture blending unit 304, an alpha test unit 306, a Z compare unit 308, an alpha blending unit 310 and a setup unit or engine and registers 312, and a dither unit 314. While each of the units 300, 302, 304, 306, 308, 310, 312 and 314 will now be described as a functional unit with specific coupling to the frame buffer 202 and the processor 208, those skilled in the art will recognize that in alternate embodiments, the units 300, 302, 304, 306, 308, 310, 312 and 314 could be routines executed by a graphics engine.

As shown in FIG. 3, the frame buffer interface 300 is coupled to bus/line 210 to send and receive data to and from the frame buffer 202. The frame buffer interface 300 is also coupled to the texture blending unit 304 via line 316 to provide data from the frame buffer 202 to the texture blending unit 304. The over sampling buffer 302 is also coupled to the frame buffer 202 by the frame buffer interface 300. The alpha test unit 306, the Z compare unit 308, the alpha blending unit 310 and the dither unit 314 all receive or send data to the frame buffer 202 through the over sampling buffer 302 and the frame buffer interface 300. For example, the frame buffer interface 300 includes much of the functionality of conventional memory interface units of existing graphic accelerators.

The setup unit and registers 312 receive commands and data from the processor 208 and store them for use by the over sampling buffer 302, the texture blending unit 304, the alpha test unit 306, the Z compare unit 308, the alpha blending unit 310 and the dither unit 314. More specifically, the setup unit and registers 312 store data per triangle that indicate the size, shade, shape, blending and other rendering characteristics. The setup unit and registers 312 are coupled to line 212 to send and receive commands and data to and from the processor 208. The setup unit and registers 312 are also coupled to the over sampling buffer 302, the texture blending unit 304, the alpha test unit 306, the Z compare unit 308, the alpha blending unit 310 and the dither unit 314 to pass on data and commands specifying how each unit 302, 304, 306, 308, 310, 312, 314 is to process data from the frame buffer 202. The coupling through the setup unit and registers 312 also provides operands and other information that the respective units 302, 304, 306, 308, 310, 312, 314 may need to perform their rendering functions.

The over sampling buffer 302 is also coupled by the frame buffer interface 300 to send and receive data to and from the frame buffer 202. The over sampling buffer 302 is also coupled to the setup unit and registers 312 by line 318, and thus, to the processor 208. An output of over sampling buffer 302 is coupled to an input of the texture blending unit 304. The over sampling buffer 302 translates data and then receives or sends the data to or from the frame buffer 202.

Figure 5:
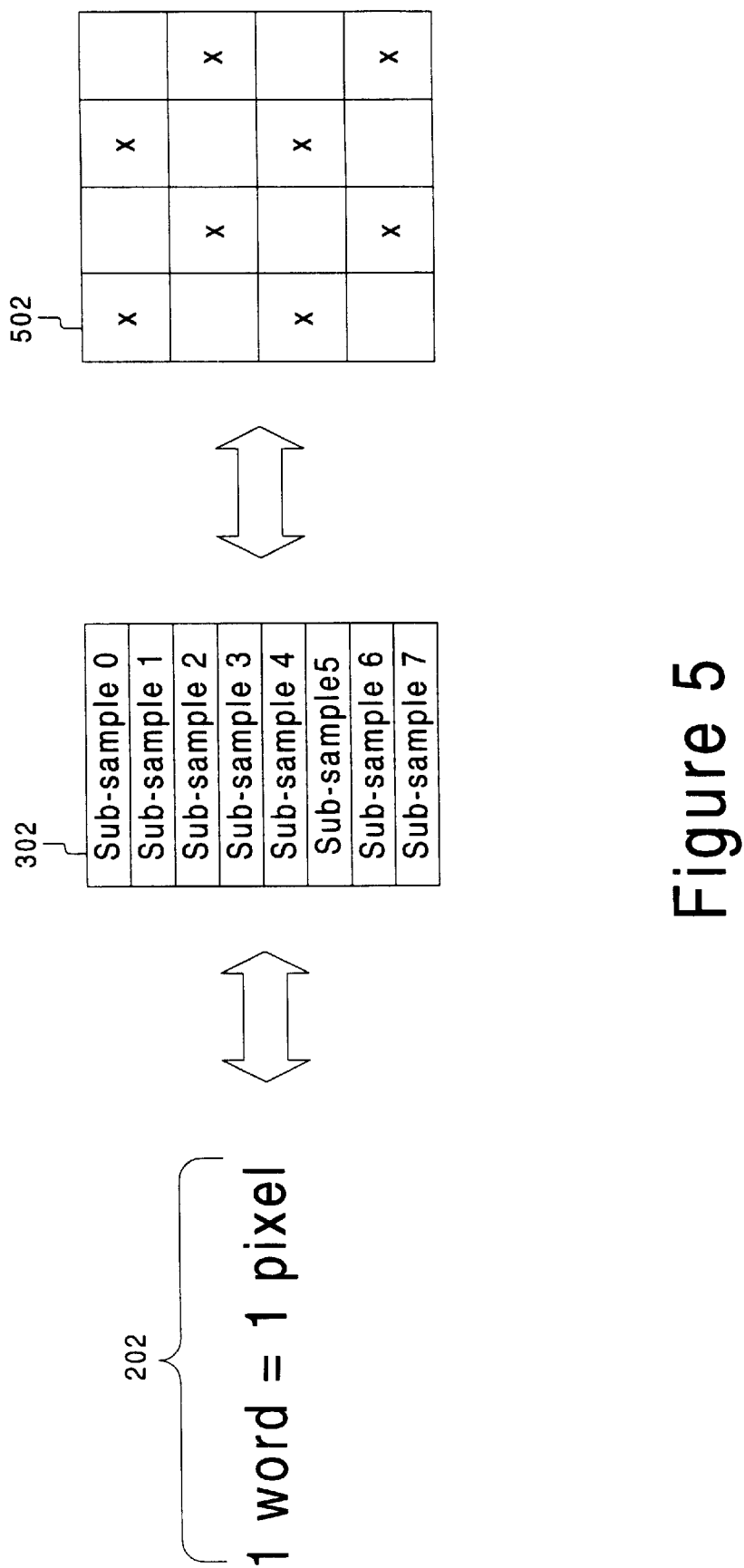
FIG. 5 is diagram illustrating the relationship between the sub-samples, their storage in the over sampling buffer and the storage of a pixel in the frame buffer.

More specifically, the present invention preferably stores the color words representing the pixels in the frame buffer 202 with one word per pixel, as illustrated in FIG. 5. The word size is preferably 16 bits to reduce the memory storage and bandwidth requirement of the frame buffer 202. However, for true color operating on 24 bits is preferred to produce higher quality images. While the present invention will now be discussed in terms of a first word size (x) that is 16 bits and a second larger word size (y) that is 24 bits, those skilled in the art will understand that the present invention applies with equal vigor for other values of x and y so long as y>x.

This difference in word sizes can best be understood with reference to FIG. 5. FIG. 5 illustrates the relationship between the pixel words as stored in the frame buffer 202, the sub-samples stored in the over sampling buffer 302 and the over sampled values 504 in relation to each other. As shown, each pixel to be rendered on the display is preferably represented as a 16-bit word in the frame buffer 202. Through the use of over sampling, the 16-bit word is used to generate eight 16-bit words or sub-samples that represent the pixel. The over sampling buffer 302 includes conventional control logic controllable by the setup unit and registers 312 to use data from the frame buffer 202 to create eight sub-samples per pixel. FIG. 5 also shows graphically the relationship of each of the sub-samples to each other in forming the pixel. The over sampling buffer 302 preferably stores the eight sub-samples in sequence consecutively as shown in the middle of FIG. 5. These eight sub-samples can in turn be used to generate the equivalent of 24-bit color. By using a matrix as shown in FIG. 5, sub-samples 0–7 are used as a substitute for storing 24-bit color per pixel in the frame buffer 202. The over sampling buffer 302 preferably has storage sufficient to hold eight sub-samples for each pixel in the frame buffer 202. The over sampling buffer 302 also includes control logic for averaging the eight sub-samples down to a single 16-bit word in the frame buffer 202. After the triangle processor (collectively the setup engines and other units) renders the sub-samples to the over sampling buffer 302, the over sampling buffer 302 filters down the eight sub-samples down to a respective pixel in the frame buffer 202. In particular, the over sampling buffer 302 simply averages the eight sub-samples in the over sampling buffer 302 down to a pixel, and writes the pixel to the frame buffer 202.

The texture blending unit 304 has inputs and outputs and is coupled to receive the output of the over sampling buffer 302. The texture blending unit 304 is coupled to the setup unit and registers 312 to receive commands and data. The texture blending unit 304 is also coupled to the frame buffer interface 300 to provide data without passing through the other units 306, 308, 310. The texture blending unit 304 performs conventional operations for blending a diffuse color with textures. The texture blending unit 304 might also perform new texture blending operations such as blending two textures together, which is not conventional. The output of the texture blending unit 304 is provided as an input to the alpha test unit 306.

Similarly, the alpha test unit 306 has input and outputs and is coupled to receive the output of the texture blending unit 304. The alpha test unit 306 is coupled to the setup unit and registers 312 to receive commands and data. The alpha test unit 306 is also coupled to output the texture blending unit 304 to receive data upon which an alpha test is performed. The output of the alpha test unit 306 is coupled to an input of the Z compare unit 308. The alpha test unit 306 performs conventional pixel rejection for specific alpha ranges. More particularly, the alpha test compares the alpha value of a pixel to a threshold that is preferably received from the set up unit and registers 312. The comparison type, =<>, is also received from the set up unit and registers 312. If the alpha value for a given pixel is greater than or equal to the threshold, then the pixel value is output by the Z compare unit 308 and passed on to the Z compare unit 308. If the alpha value for a given pixel is not greater than or equal to the threshold then the pixel is rejected without additional processing. The output of the alpha test unit 306 is provided as an input to the Z compare unit 308.

Likewise, the Z compare unit 308 has input and outputs and is coupled to receive the output of the alpha test unit 306. The Z compare unit 308 is coupled to the setup unit and registers 312 to receive commands and data. The Z compare unit 308 is also coupled to the over sampling buffer 320 via line 320 to provide data without passing through the alpha blending unit 310, and to receive data to be processed directly from the over sampling buffer 302. The Z compare unit 308 performs a conventional Z comparison that is used to allow the programmer to eliminate the rendering of hidden lines and surfaces based on the Z value. The output of the Z compare unit 308 is provided as an input to the alpha blending unit 310.

The alpha blending unit 310 has input and outputs, and is coupled to receive the output of the Z compare unit 308. The alpha blending unit 310 is coupled to the setup unit and registers 312 to receive commands and data. The alpha blending unit 310 is also coupled to the over sampling buffer 302 to receive the source or destination values for the pixels. The alpha blending unit 310 performs both conventional alpha blending and also alpha blending for pixels represented by multiple sub-sample words. For example, the present invention is described in terms of each pixel having eight sub-samples of 16-bits each. However, those skilled in the art will recognize that the present invention is applicable to numbers of sub-samples other than eight and word sizes other than 16 bits. As has been noted above, the alpha blending operation provides the user with the ability to create images that appear transparent by blending a source image with a background or destination image. The output of the alpha blending unit 310 is coupled to the input of the dither unit 314.

Finally, the dither unit 314 has inputs and outputs, and is coupled to receive the output of the alpha blending unit 310. The dither unit 314 is coupled to the setup unit and registers 312 to receive commands and data. The dither unit 314 is also coupled to the over sampling buffer 302 to receive data used for dithering and for storing blended and dithered data back in the over sampling buffer 302. The dithering unit 314 is of a conventional type performing color dithering according the values output by the alpha blending unit 310.

Figure 4:
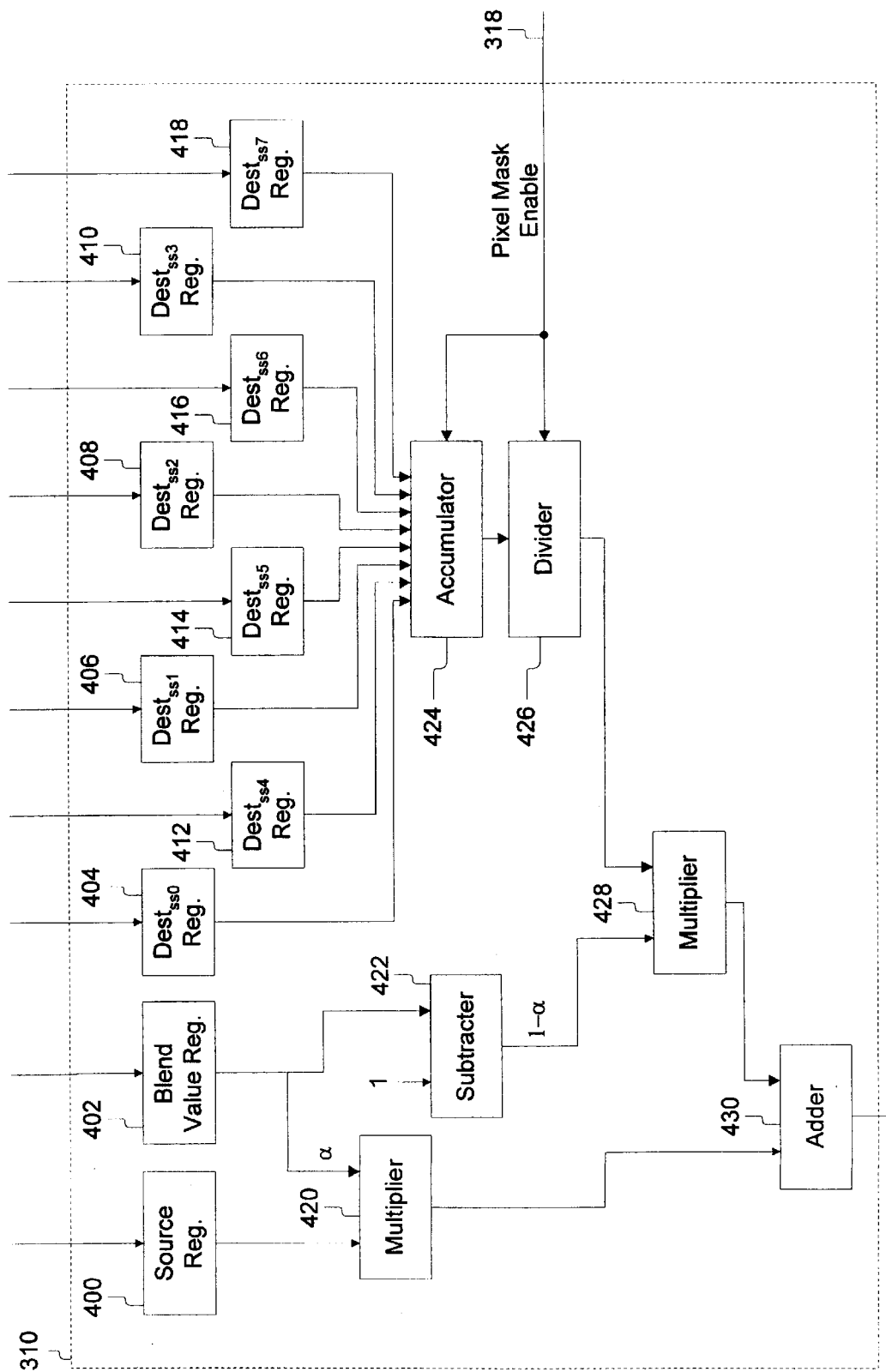
FIG. 4 is block diagram of an exemplary embodiment of an alpha blending unit constructed according to the present invention.

FIG. 4 shows an exemplary embodiment of the alpha blending unit 310 of the present invention. The preferred embodiment of the alpha blending unit 310 includes a source register 400, a blend value register 402, a plurality of sub-sample destination registers 404, 406, 408, 410, 412, 414, 416, 418, a first multiplier 420, a subtracter 422, an accumulator 424, a divider or shifter 426, a second multiplier 428 and an adder 430. FIG. 4 illustrate the operation of portions of the alpha blending unit 310 in processing blending for a single pixel.

The source register 400 has an input and an output, and stores a source color value during the blending operation. The input of the source register 400 is coupled to receive the source color value corresponding to the pixel from the frame buffer 202 or the set up unit registers 312. The output of the source register 400 is coupled to the input of the first multiplier 420 and is used to generate a first portion of the ultimate blend value.

The blend value register 402 has an input and an output, and stores the blend value ($\alpha$) to be used in during the blending operation. As noted above, the blend value ($\alpha$) indicates the fractional value to the blend result that will be provided by the source color. The input of the blend value register 402 is coupled to receive the blend value corresponding to the pixel from the frame buffer 202 or the set up unit registers 312. The output of the blend value register 402 is coupled to the input of the first multiplier 420 and is used to generate a first portion of the ultimate blend value. The output of the blend value register 402 is also coupled to an input of the subtracter 422 and used to generate the second portion of the ultimate blend value.

The alpha blending unit 310 also provides a plurality of sub-sample destination registers 404, 406, 408, 410, 412, 414, 416, 418. Each of the plurality of sub-sample destination registers 404, 406, 408, 410, 412, 414, 416, 418 has an input coupled to receive one of the destination sub-sample values corresponding to the pixel from the frame buffer 202 or the set up unit registers 312. In accordance with the present invention, the alpha blending unit 310 may use any number of the sub-sample buffers from zero to eight. For example, if only 3 of the sub-samples are to blended, then only 3 register are used, and the remaining registers output a zero value. The output of each sub-sample destination register 404, 406, 408, 410, 412, 414, 416, 418 is coupled to the input of the accumulator 424. The present invention advantageously used a clever technique to reduce the computation required to perform alpha blending. To reduce the amount of work needed to do alpha blending with over sampling, a single alpha blend is performed rather than performing eight alpha blends, one with each sub-sample. The sub-sample destination registers 404, 406, 408, 410, 412, 414, 416, 418 are used to respectively store all 8 sub-samples (for a single pixel) from the destination which is based on (X, Y) in screen space. The sub-sample destination registers 404, 406, 408, 410, 412, 414, 416, 418 are coupled to the over sampling buffer 302 to receive the data.

As noted above, the inputs of the accumulator 424 are coupled to the outputs of the sub-sample destination registers 404, 406, 408, 410, 412, 414, 416, 418. The accumulator 424 sums the signals from the sub-sample destination registers 404, 406, 408, 410, 412, 414, 416, 418 and outputs the sum to the shifter 426. The accumulator 424 also has a control input coupled to the output of the setup unit and registers 312 via line 318 to receive commands and data. In particular, the setup unit and registers 312 provide a pixel mask signal that indicates which of the pixel sub-samples are to be summed together. For example, the setup unit and registers 312 provide an eight-bit value each bit indicating which of the sub-samples are to be blended. The shifter 426 advantageously divides the sum output by the accumulator 424 by the number of sub-samples that are included within the sum. The signal for controlling the divider 426 is provided by setup unit and registers 312. In particular, the divider 426 also receives the pixel mask signal, and divides the sum by the number of bits that have a value of one in the pixel mask signal. As noted above, only some of the sub-samples may be modified. For those sub-samples, the accumulator 424 totals the destination color values. Then the output of the accumulator 424 is divided by the shifter 426 in response to the control signal (pixel mask signal) and according to the number of sub-samples being totaled to produce an average destination color. The shifter 426 then outputs the average destination color to the second multiplier 428.

The other input to the second multiplier 428 is provided from the subtracter 422. The subtracter 422 provides the value of one minus the blend value $(1-\alpha)$. The subtracter 422 preferably has a first input coupled to receive a value of 1 and a second input coupled to receive the blend value. Those skilled in the art will realize that this may be accomplished with in other logical ways such as using an adder and inverters. The second multiplier 428 multiplies the average destination color by the one minus the blend value to produce the second portion of the blend result. The output of the first and second multipliers 420 and 428 are combined by adder 430 which provides a blend value that can be re-stored for all the sub-samples that are being modified. This can be done after dithering as shown in FIG. 3. Alternatively, the blended value could be stored back in the over sampling buffer 302 for each modified sub-sample without dithering.

Once the blended values have been stored back in the over sampling buffer 302, the sub-samples forming each pixel are converted back to pixel values for storage in the frame buffer 202. More specifically, the eight sub-samples corresponding to a pixel are box filtered for storage as a single value in the frame buffer 202. In other words, the eight sub-samples are averaged to produce a value that can be stored back in the frame buffer 202 to represent the pixel.

The alpha blending unit 310 of the present invention is particularly advantageous as can be seen from a comparison to performing alpha blending according to the prior art. The first column in Table 1 indicates the number of operations required to perform alpha blending with the prior art versus performing alpha blending with the present invention.

TABLE 1

| Prior art | Present invention |
|---|---|
| 8 read operations to read sub-samples | 8 read operations to read sub-samples |
| 8 blend operations (1 per sub-sample) | 1 blend operation |
| 8 write operations to store sub-samples | 8 write operations to store sub-samples |
| 24 operations | 17 operations |

As can be seen from the above table there is a significant computational saving to performing alpha blending according to the present invention. This value is further heightened when one considers that such a savings will result for each pixel and there are at least 640×480 pixels in an image.

Figure 6:
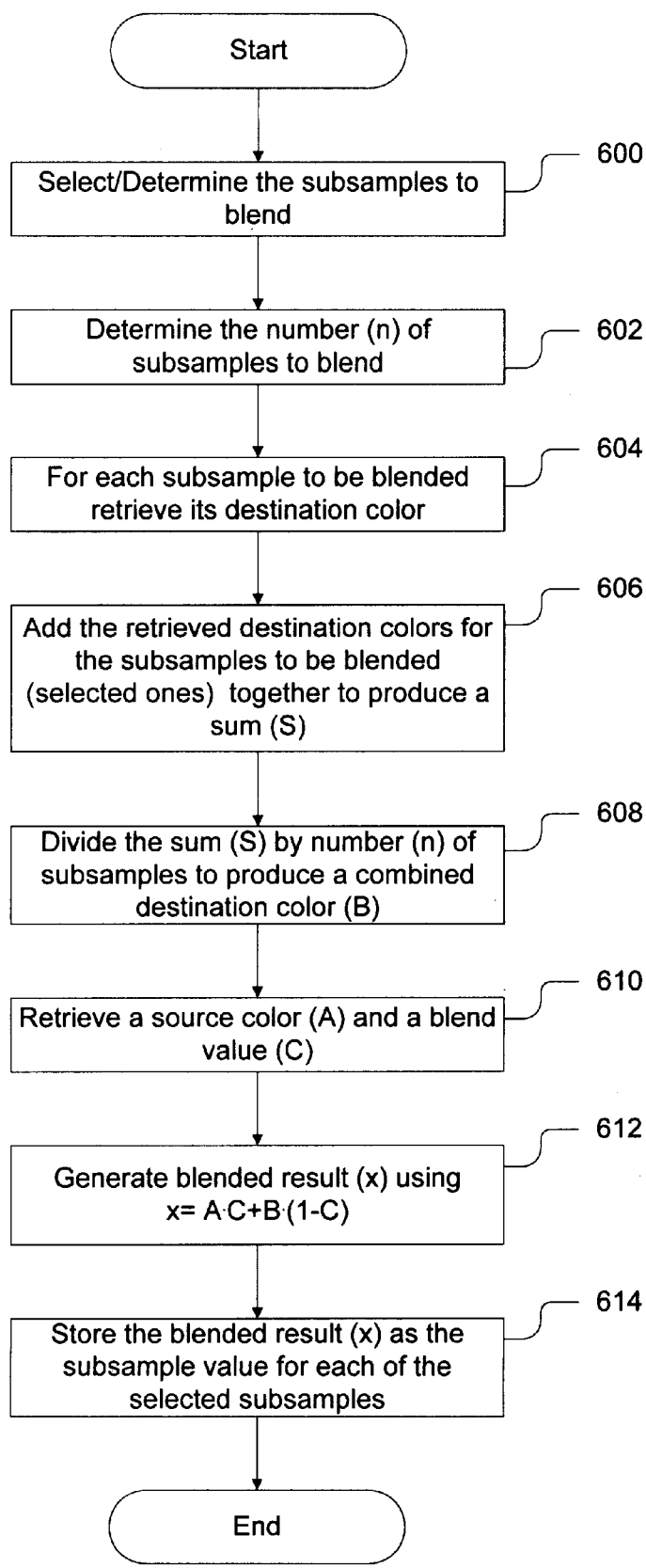
FIG. 6 is a flow chart of the preferred process for performing alpha blending according to the present invention.

Referring now to FIG. 6, a flow chart of the preferred process for performing alpha blending according to the present invention is shown. The present invention begins in step 600 by determining the sub-samples to be blended. Each pixel is preferably represented by eight sub-samples and the present invention is able to selectively blend any number of the sub-samples from 1 to 8. The number of sub-samples and which sub-samples to be blended are specified by the pixel mask signal received from the set up unit and registers 312. Once the sub-samples to be blended have been identified, the method continues in step 602 to determine the number (n) of sub-samples to be blended. Counting the number of 1 bits in the pixel mask signal does this. This is critical because this step identifies the divisor used in producing a composite or average destination color. Then in step 604, the destination color value for each of the sub-samples is retrieved from the frame buffer 202 and store in a respective register 404, 406, 408, 410, 412, 414, 416, 418. Then in step 606, the retrieved destination color for each sub-sample is added together by the accumulator 424 to produce a sum (S). Then in step 608, the sum (S) is divided by the number (n) of sub-samples as determined in step 602 to produce the composite or average destination color. Then in step 610, the source color (A) is retrieved and stored in the source color register 400. Similarly, the blend value (C) is retrieved and stored in the blend value register 402. Next in step 612, a single blend result (x) is generated by using the other components of the alpha blending unit 310 according to the equation $x = A \cdot C + B \cdot (1-C)$. Finally, in step 614, the blend result (x) is stored back in the frame buffer 202 as the destination color for each of the n sub-samples. In an alternate embodiment, the blend result x may be used in a simple box filter for all 8 sub-samples forming the pixel before being stored back in the frame buffer 202 as the destination color.

While the present invention has been described with reference to certain preferred embodiments, those skilled in the art will recognize that various modifications may be provided. These and other variations upon and modifications to the preferred embodiments are provided for by the present invention.

What is claimed is:

1. A system for blending a source color value with at least one color value using a blend value, the system comprising:
    a source register for storing a source color value, the source register having inputs and outputs, the inputs of source register coupled to receive a source color value;
    a blend register for storing a blend value, the blend register having inputs and outputs, the inputs of blend register coupled to receive a blend value;
    a composite destination generator having inputs and outputs, the composite destination generator for producing a composite destination color value, the inputs of the composite destination generator coupled to receive a plurality of destination color values; and
    a blending unit having inputs and outputs, the blending unit coupled to the output of the source register, the output of the blend register and the output of the composite destination generator, the blending unit producing a blend result from the source color value, the blend value and the composite destination color value.

2. The system of claim 1, wherein the composite destination generator further comprises:
    an accumulator having a plurality of inputs and output for summing a plurality of destination color values, the plurality of inputs coupled to receive respective destination color values; and
    a divider having a first input, a second input and an output, the divider generating the composite color value, the first input coupled to the output of the accumulator, the second input coupled to receive a value indicating the number of color values being combined.

3. The system of claim 1, wherein the composite destination generator further comprises and adder coupled to receive a pixel mask signal.

4. The system of claim 1, wherein the divider is a group of shift and add registers.

5. The system of claim 2, wherein the composite destination generator further comprises a plurality of destination registers, each of the destination registers storing a respective sub-sample of the destination color for a pixel, each of the destination registers having an input and an output, the inputs of the destination registers coupled to receive respective destination sub-sample color values, the outputs of the destination registers coupled to respective inputs of the accumulator.

6. The system of claim 5, wherein the number of destination registers is eight.

7. The system of claim 1, wherein blending unit further comprises:

a first multiplier having inputs and outputs, the first multiplier coupled to the output of the source register and the output of the blend register, the first multiplier generating a first portion of the blend result;

a subtracter having inputs and outputs, the subtracter coupled to the output of the blend register, the subtracter generating a value for blending the destination color;

a second multiplier having inputs and outputs, the second multiplier coupled to the output of the subtracter and the composite destination generator, the second multiplier generating a second portion of the blend result; and an adder having inputs and an output, the inputs coupled to output of the first multiplier and the second multiplier for receiving the first portion and the second portion, the adder summing the first and second portion to produce the blended result.

8. The system of claim 1, further comprising a box filter having inputs and outputs, the input of the box filter coupled to the output of the over sampling buffer, and the output of the box filter coupled to the input of a frame buffer interface.

9. The system of claim 1, further comprising an over sampling buffer having a first set of inputs/outputs, a second set of input/outputs, and a third set of inputs/outputs, the first set of inputs/outputs of over sampling buffer coupled a frame buffer, a second set of input/outputs of the over sampling buffer coupled to the source register, and the third set of inputs/outputs coupled between the over sampling buffer and the alpha blending unit.

10. A method for performing blending of a pixel represented by a plurality of sub-samples with a source color value, the method comprising the steps of:

determining a number of sub-samples to be blended;

retrieving a destination color value for each sub-sample;

adding the retrieved destination color value for each sub-sample to produce a sum;

generating a composite destination color value;

retrieving a source color value;

retrieving a blend value; and generating a blended result using the retrieved source color value, the blend value and the composite destination color value.

11. The method of claim 10, wherein each pixel is represented by a plurality of sub-samples and the method further comprising the steps of:

selecting a pixel for blending; and determining a subset of the plurality of the sub-samples to be blended.

12. The method of claim 10, wherein the step of generating a composite destination color value is performed by dividing the sum by the determined number of sub-samples to be blended.

13. The method of claim 10, wherein the step of generating the blend result further comprises the steps of:

multiplying the source color value by the blend value to produce a first portion;

subtracting the blend value from one to produce a subtracted value;

multiplying the composite destination color value by the subtracted value to produce a second portion; and adding the first portion and the second portion to produce the blend result.

14. The method of claim 10 further comprising the step of storing the blended result back in the frame buffer as the destination color for each of the retrieved sub-samples.

15. The method of claim 10 further comprising the step of box filtering the blended result.

16. An apparatus for performing blending of a pixel represented by a plurality of sub-samples with a source color value, the apparatus comprising:

means for determining a number of sub-samples to be blended;

means for retrieving a destination color value for each sub-sample;

means for adding the retrieved destination color value for each sub-sample to produce a sum;

means for generating a composite destination color value;

means for retrieving a source color value;

means for retrieving a blend value; and means for generating a blended result using the retrieved source color value, the blend value and the composite destination color value.

17. The apparatus of claim 16, wherein each pixel is represented by a plurality of sub-samples and the apparatus further comprises:

means for selecting a pixel for blending; and means for determining a subset of the plurality of the sub-samples to be blended.

18. The apparatus of claim 16, wherein the means for generating a composite destination color value divides the sum by the determined number of sub-samples to be blended.

19. The apparatus of claim 16, wherein the means for generating the blend result further comprises:

means for multiplying the source color value by the blend value to produce a first portion;

means for subtracting the blend value from one to produce a subtracted value;

means for multiplying the composite destination color value by the subtracted value to produce a second portion; and means for adding the first portion and the second portion to produce the blend result.

20. The apparatus of claim 16 further comprising means for storing the blended result back in the frame buffer as the destination color for each of the retrieved sub-samples.

21. The apparatus of claim 16 further comprising means for box filtering the blended results.

* * * * *